Patented June 26, 1951

2,558,380

UNITED STATES PATENT OFFICE 2,558,380

PROCESS FOR PRODUCING ESTERS OF POLYPHOSPHORIC ACIDS

Edwin P. Plueddemann, Woodbridge, N. J., assignor to Food Machinery and Chemical Corporation, a corporation of Delaware No Drawing. Application July 2, 1947, Serial No. 758,727

9 Claims. (Cl. 260—461)

This invention relates to the production of esters of polyphosphoric acids, and more particularly, to the production of alkyl esters of tetraphosphoric acid from alcohols and phosphorus oxyhalogenides.

For the purposes of this invention, polyphosphoric acids and condensed phosphoric acids are synonymous and when such terms are used herein, it will be understood that they refer to those phosphoric acids which are more molecularly dehydrated than orthophosphoric acid and less molecularly dehydrated than metaphosphoric acid. Such acids include pyrophosphoric acid, $H_4P_2O_7$; triphosphoric acid, $H_5P_3O_{10}$; tetraphosphoric acid, $H_6P_4O_{13}$; pentaphosphoric acid, $H_7P_5O_{16}$; and others.

A product generally referred to as hexaethyl tetraphosphate has recently come into prominence as an outstanding aphicide and miticide. One of the commercial methods of producing this and related esters of polyphosphoric acids consists of reacting at least 3 mols of a trialkyl ester of orthophosphoric acid with one mol of phosphoric acid oxyhalogenide, more particularly phosphorus oxychloride.

I have discovered that esters of tetraphosphoric acid and other polyphosphoric acids can be produced much more advantageously by reacting alcohols with phosphorus oxyhalogenides in proper proportions and under carefully controlled conditions. To obtain these esters, ordinarily less than 3 mols of an alcohol, more particularly about 2.5 mols or less of the alcohol are reacted with one mole of the halogenide. I have discovered further that by variation and control of the amount of alcohol used in the reaction within these molar ratios, different desirable polyphosphate esters and mixtures of the same may be prepared. For example, tetra-alkyl pyrophosphate esters can be produced by reacting 2 moles of phosphorus oxychloride with about 5 moles of an alcohol, penta-alkyl triphosphates can be produced by reacting 3 moles of phosphorus oxychloride with about 7 moles of an appropriate alcohol, and hexa-alkyl tetraphosphates can be produced by reacting 4 moles of phosphorus oxychloride with about 9 moles of a proper alcohol. In a similar manner, esters of other polyphosphoric acids can be produced. Thus it is seen that esters of any one of a number of polyphosphates can be produced by using different proportions of the reactants.

In practice it has been found necessary to use a small excess of alcohol in a quantity varying from about 5 to 10 per cent above the amount theoretically necessary if the above specified products are to be obtained in the highest yields possible. It should be understood that where the reaction of alcohols and halogenides in certain ratios is described herein, it is contemplated that the reactant mass contains this small excess of alcohol. Reaction under anhydrous conditions ordinarily leads to purer products and hence water-free reactants are preferred.

For practical reasons phosphorus oxychloride is the preferred phosphorus oxyhalogenide, although the iodides or bromides can be used.

Various substituted and unsubstituted alcohols may be employed to prepare a variety of esters of polyphosphoric acids, all within the scope of the invention. Due to a resultant greater ease in purifying the final product, however, lower molecular primary aliphatic substituted and unsubstituted alcohols, particularly those having 5 carbon atoms or less, such as methyl, ethyl, propyl, n-butyl, isobutyl, and ethylene chlorohydrin, are preferred.

In a special embodiment of the invention leading to products of highest quality, the reaction is initially carried out at reduced or subatmospheric pressure, of the order of 30 mm. of mercury or less, under anhydrous conditions, and at a low temperature in the neighborhood of —15° to 0° C. but more advantageously at a temperature not exceeding 130° C., until the reaction goes to completion or until the organic chloride corresponding to the alcohol used is no longer evolved. In the second phase of this reaction, a higher pressure up to atmospheric pressure may be used, although pressures of 70 mm. of mercury or less are preferred in this embodiment.

In carrying out the above reaction, the required amount of low molecular aliphatic alcohol is introduced into a jacketed reaction vessel provided with an agitator, a means for cooling and a means for heating the contents. The reactor is connected with an acid-resistant pumping means for producing a partial vacuum. In the operation of the process, the alcohol is cooled to about —15° to 0° C. and the phosphorus oxychloride slowly added with agitation at such a rate that the temperature remains low. After the reagents are mixed, the pressure is reduced to about 20 to 30 mm. of mercury to aid the evolution of hydrochloric acid and the temperature gradually allowed to rise to about 0° C. over a period of about three hours. After the evolution of the hydrogen chloride has subsided, the temperature is gradually raised to about 130° C. to complete the second step of the reaction, which is accompanied by the evolution of the chloride of the alcohol employed.

In the preparation of the medium or higher weight alkyl esters, a pressure of about 30 mm. of mercury is maintained throughout the reaction to facilitate the removal of the alkyl halides. For certain of the lower alkyl esters, however, a pressure of about 70 mm. mercury is maintained during the second phase of the reaction to preclude the volatilization of certain desirable reaction products or reaction intermediates.

Broadly considered, the invention contemplates carrying out the whole reaction of the described alcohols and phosphorus oxychloride under atmospheric pressure conditions. It also contemplates initial reaction at low temperatures of from $-15°$ to $20°$ C. as well as at higher temperatures up to $40°$ C. or even higher. Although product quality or purity may suffer when these higher pressures and temperatures are employed, the loss may be more than compensated for by the greater ease and less cost of production resulting from the avoidance of the expense of excessive vacuum and refrigerating requirements.

By proper control of the reaction conditions as disclosed herein, substantially colorless products can be recovered in almost quantitative yields.

The following examples further illustrate my invention:

Example 1

Two hundred forty grams (5.2 moles) of anhydrous ethyl alcohol is cooled to $0°$ C. in an ice-cooled reaction vessel and maintained at a temperature below $5°$ C. while adding 308 grams (2 moles) of phosphorus oxychloride under agitation. The resulting mixture is evacuated to approximately 20 mm. of mercury pressure for a period of about three hours. During the evacuation the temperature is permitted to rise to $20°$ C. A vigorous evolution of hydrogen chloride ensues at first but subsides at the end of three hours. The mixture is gradually warmed to $130°$ C., and the pressure is increased to about 70 mm. of mercury when the temperature reaches $75°$ C. The vigorous evolution of ethyl chloride starts at about $60°$ C. but subsides almost completely within two hours at $130°$ C. The resulting tetraethyl pyrophosphate product is a water clear liquid of low viscosity having a specific gravity of 1.190, a refractive index of 1.418, and a residual chloride content of less than 0.2 per cent.

The physical characteristics of the tetraethyl pyrophosphate definitely identifies the product as the same as that derived by the classical reaction of a silver salt of an appropriate phosphate with alkyl halide.

Example 2

The hexaethyl tetraphosphate product is prepared in a manner exactly analogous to that employed in the preceding example except the molar proportions of ethyl alcohol and the phosphorus oxychloride are different. In this example 45 grams of ethyl alcohol, constituting 9 moles plus an 8 per cent excess, is reacted with 61.5 grams (4 moles) of phosphorus oxychloride. The resulting hexaethyl tetraphosphate product recovered is a water clear liquid of moderately low viscosity having a specific gravity of 1.272, a refractive index of 1.424, and a residual chloride content of less than 0.3 per cent. The physical characteristics of this product definitely identifies it as the substantial equivalent of hexaethyl tetraphosphate produced by other methods, although the product, due to the absence of color, apparently is purer than the product produced by conventional commercial methods.

Example 3

An initial reaction of butyl alcohol and phosphorus oxychloride is carried out in exactly the same manner as is set forth in the two preceding examples. During the second phase of the reaction, effected in a period of about six hours at a temperature of $140°$ C., the pressure is maintained initially at 30 mm. mercury. The resulting hexabutyl tetraphosphate is an amber-colored liquid of moderate viscosity having a specific gravity of 1.22 and a residual chloride content of less than 0.4 per cent.

Theoretical considerations and available testing methods indicate that the phosphates produced by the herein described processes are correctly identified, but since no generally accepted methods of positively determining polyphosphate structures in phosphate reaction products are known, I do not wish to be limited by any possibly incorrect designation of the constitution of the polyphosphate products. The hexaethyl tetraphosphate, for example, may in part be tetraethyl pyrophosphate or may be a complex mixture of polyphosphates and polymers and isomers thereof.

Performance tests conducted to compare the entomological potency of the products produced by the present invention with those produced by present known commercial processes from triethyl phosphate and phosphorus oxychloride tend to show identity of structure. In the following table there are set forth the results of tests comparing two samples of hexaethyl tetraphosphate produced by the known processes (designated in the table by the letter A) with two samples of the hexaethyl tetraphosphate products of the present invention (designated by the letter B).

| Product Tested | Excess Alcohol, Per Cent | Temp. of Initial Reaction, °C. | $d_4^{25}$ | Dilution 1:6,000 Per Cent Dead | | Dilution 1:10,000 Per Cent Dead | |
|---|---|---|---|---|---|---|---|
| | | | | Aphids | Mites | Aphids | Mites |
| A | | | 1.283 | 97 | 91 | 56 | 66 |
| B | 9 | 5 | 1.272 | 92 | 94 | 54 | 65 |
| A | | | 1.237 | 95 | 88 | 60 | 43 |
| B | 9 | 10-20 | 1.403 | 92 | 59 | 56 | 52 |

It will be understood that the foregoing description and examples are purely illustrative and that our invention contemplates all equivalents within the scope of the invention as defined by the appended claims.

I claim:

1. A process for producing esters of polyphosphoric acids comprising reacting phosphorus oxyhalogenide with an alcohol at subatmospheric pressures in molar ratios in the range from, and including, 1:2.25 to, but not including 1:3, said reaction being conducted initially at temperatures not substantially exceeding $40°$ C. while removing evolved hydrogen halide until hydrogen halide is substantially no longer evolved, and being continued at temperatures ultimately exceeding $100°$ C. but below the decomposition temperatures of the materials used while removing the evolved halide of said alcohol until the halide of such alcohol is substantially no longer evolved.

2. A process for producing esters of polyphosphoric acids comprising reacting a phosphorus oxyhalogenide with an alcohol at subatmospheric pressures in a molar ratio of about 1:2.5, said reaction being conducted initially at temperatures not exceeding substantially 40° C. while removing evolved hydrogen halide until hydrogen halide is substantially no longer evolved, and being continued at temperatures ultimately exceeding 100° C. but below the decomposition temperatures of the materials used while removing the evolved halide of said alcohol until the halide of said alcohol is substantially no longer evolved.

3. A process for producing hexaethyl tetraphosphate comprising reacting phosphorus oxychloride with ethyl alcohol at subatmospheric pressures in the approximate molar ratio of 4:9, said reaction being conducted initially at temperatures not substantially exceeding 40° C. while removing evolved hydrogen chloride until hydrogen chloride is substantially no longer evolved, and being continued at temperatures ultimately exceeding 100° C. but not substantially exceeding 140° C. while removing the evolved ethyl chloride until the ethyl chloride is substantially no longer evolved.

4. A process for producing pentaethyl triphosphate comprising reacting phosphorus oxychloride with ethyl alcohol at subatmospheric pressures in the approximate molar ratio of 3:7, said reaction being conducted initially at temperatures not substantially exceeding 40° C. while removing evolved hydrogen chloride until hydrogen chloride is substantially no longer evolved, and being continued at temperatures ultimately exceeding 100° C. but not substantially exceeding 140° C. while removing the evolved ethyl chloride until the ethyl chloride is substantially no longer evolved.

5. A process for producing tetraethyl pyrophosphate comprising reacting phosphorus oxychloride with ethyl alcohol at subatmospheric pressures in the approximate molar ratio of 2:5, said reaction being conducted initially at temperatures not substantially exceeding 40° C. while removing evolved hydrogen chloride until hydrogen chloride is substantially no longer evolved, and being continued at temperatures ultimately exceeding 100° C. but not substantially exceeding 140° C. while removing the evolved ethyl chloride until the ethyl chloride is substantially no longer evolved.

6. A process of producing hexaethyl tetraphosphate comprising reacting phosphorus oxychloride with ethyl alcohol in the approximate molar ratio of 4:9, the reaction being first carried out below 10° C. under subatmospheric pressure while removing evolved hydrogen chloride until hydrogen chloride is substantially no longer evolved, and being continued under subatmospheric pressure and at temperatures ultimately exceeding 100° C. but below the decomposition temperatures of the materials used while removing the ethyl chloride formed until ethyl chloride is substantially no longer evolved.

7. A process of producing pentaethyl triphosphate comprising reacting phosphorus oxychloride with ethyl alcohol in the approximate molar ratio of 3:7, the reaction being first carried out below 10° C. under subatmospheric pressure while removing evolved hydrogen chloride until hydrogen chloride is substantially no longer evolved, and being continued under subatmospheric pressure and at temperatures ultimately exceeding 100° C. but below the decomposition temperatures of the materials used while removing the ethyl chloride formed until ethyl chloride is substantially no longer evolved.

8. A process of producing tetraethyl pyrophosphate comprising reacting phosphorus oxychloride with ethyl alcohol in the approximate molar ratio of 2:5, the reaction being first carried out below 10° C. under subatmospheric pressure while removing evolved hydrogen chloride until hydrogen chloride is substantially no longer evolved, and being continued under subatmospheric pressure and at temperatures ultimately exceeding 100° C. but below the decomposition temperatures of the materials used while removing the ethyl chloride formed until ethyl chloride is substantially no longer evolved.

9. A process for producing esters of polyphosphoric acid which comprises reacting phosphorus oxychloride with an anhydrous alcohol at subatmospheric pressures in molar ratios in the range from, and including, 1:2.25 to, but not including, 1:3 while maintaining anhydrous conditions, said reaction being conducted initially at temperatures not substantially exceeding 40° C. while removing evolved hydrogen chloride until hydrogen chloride is substantially no longer evolved, and being continued at temperatures ultimately exceeding 100° C. but below the decomposition temperatures of the materials used while removing the evolved chloride of said alcohol until the chloride of said alcohol is substantially no longer evolved.

EDWIN P. PLUEDDEMANN.

REFERENCES CITED

The following references are of record in the file of this patent:

UNITED STATES PATENTS

| Number | Name | Date |
| --- | --- | --- |
| 1,844,408 | Nicolai | Feb. 9, 1932 |
| 2,046,031 | Mugdan et al. | June 30, 1946 |

OTHER REFERENCES

Wichelhaus: Annalen der Chem. und Pharmazie, supplement vol. 6 (1868), p. 264.

Balarew: Zeit. Anorg. Allgem. Chem., vol. 99 (1917), pages 187 to 189.

Gerrard: Jour. Chemical Society (London), vol. 1940, page 1466.

Adler et al.: Chemical Industries, vol. 51 (1942), page 519.

Hall et al.: Industrial and Engineering Chemistry, vol. 40 (Apr. 1948), pp. 694 to 699.

Thurston: Organic Chemical Intermediates for Insecticides, Fungicides and Rodenticides. FIAT Final Report No. 949, Office of Technical Services No. PB 60890, pp. 16 to 19, title page dated October 14, 1946, released May 30, 1947.